JOHN N. WALLIS & T. WALLIS.
Improvement in Harvester Droppers.

No. 116,120.    Patented June 20, 1871.

Witnesses:

Inventors:
J. N. Wallis.
T. Wallis.
PER
Attorneys.

116,120

UNITED STATES PATENT OFFICE.

JOHN N. WALLIS AND THEODORE WALLIS, OF FLEMING, NEW YORK, ASSIGNORS OF ONE-THIRD OF THEIR RIGHT TO HENRY G. WISE, OF SAME PLACE.

IMPROVEMENT IN HARVESTER-DROPPERS.

Specification forming part of Letters Patent No. 116,120, dated June 20, 1871.

*To all whom it may concern:*

Be it known that we, JOHN N. WALLIS and THEODORE WALLIS, of Fleming, in the county of Cayuga and State of New York, have invented a new and useful Improvement in Dropper and Carrier for Harvesters; and we do hereby declare that the following is a full, clear, and exact description thereof, which will enable others skilled in the art to make and use the same, reference being had to the accompanying drawing forming part of this specification.

Figure 1:
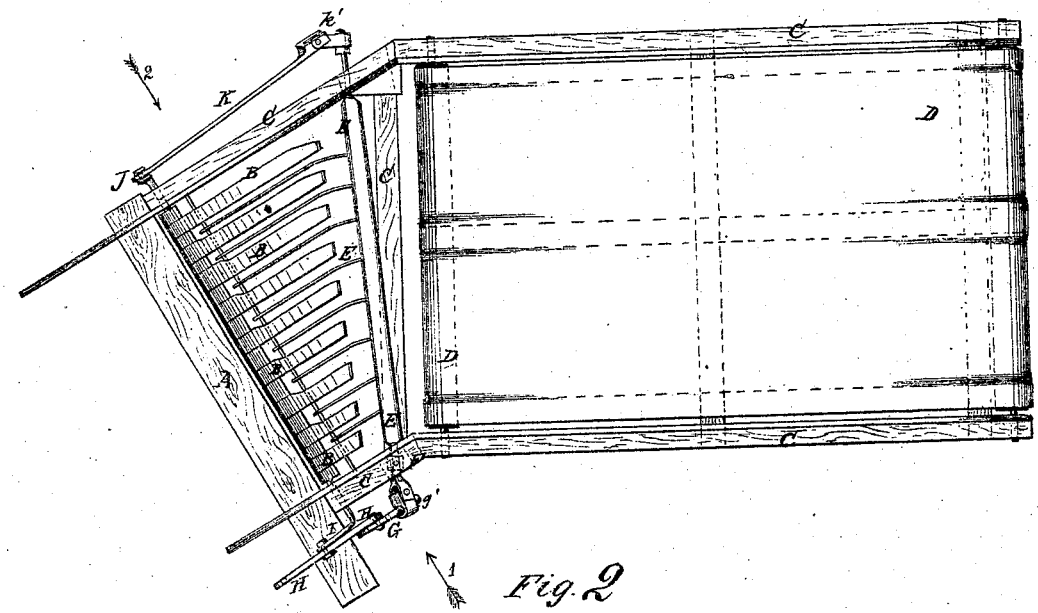
Figure 2:
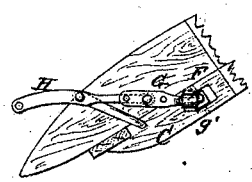
Figure 3:
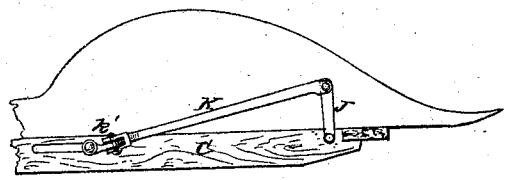

Figure 1 is a top view of our improved attachment. Fig. 2 is a detail side view of a portion of the same, looking in the direction of arrow 1. Fig. 3 is a detail side view of a portion of the same, looking in the direction of arrow 2.

Our invention has for its object to furnish an improved attachment for harvesters which shall be so constructed as to drop the grain in compact gavels at the rear of the body of the machine, entirely out of the way of the machine on its next round, and which shall at the same time be simple in construction and convenient in operation; and it consists in the construction and combination of the various parts of the attachment, as hereinafter more fully described.

A represents the cutter-bar of the harvester. B is the dropper, consisting of a series of parallel bars or slats attached at their forward ends to a shaft, the journals of which work in bearings in the frame-work C. The frame-work is extended back with an inclination toward the rear of the body of the machine and to its pivoted rollers, around which passes the endless apron D. The endless apron D is driven from the mechanism of the reaper by any of the well-known means for transmitting power. The endless apron D is designed to receive the gavels from the dropper and transfer them to the rear of the body of the machine, and drop them to the ground in such positions as to be entirely out of the way of the machine in its next round. The grain is transferred from the dropper B to the endless apron D by the beater E, which consists of a series of slightly-curved fingers attached to a shaft, the journals of which work in bearings in the frame-work C. The fingers of the beater E pass up between the slats of the dropper B, and lift the grain from said dropper and transfer it to the endless apron D. The inner journal of the beater E passes through and works in a short vertical stud, F, pivoted in a horizontal slat in the bar of the frame C. To the projecting ends of the inner journal of the beater E is attached, by a joint connection, $g'$, a crank-arm, G, to which is pivoted the end of the rod or bar H, several holes being formed in the crank-arm G for the reception of the pivoting-pin, so that the throw or movement of the beater E may be regulated as desired. To the projecting end of the inner journal of the dropper B is attached a crank-arm, I, the end of which is pivoted to the middle part of the bar or rod H. By this device, by operating the connecting-rod H the dropper B will be lowered and the beater E raised to take the grain from the dropper B and transfer it to the endless apron D. The rod H is designed to be connected with a foot-lever, so that it may be operated by the driver with his foot. To the projecting end of the outer journal of the dropper B is attached a crank-arm, J, to the end of which is pivoted the forward end of the connecting-rod K, the rear end of which is connected by a double-jointed connection, $k'$, with the projecting end of the outer journal of the beater E, which journal passes through and works in a horizontal slot in the side bar of the frame C. By this device, as the dropper B is lowered and the beater E is raised to transfer the grain to the endless apron D, the outer end of the beater E is moved back to transfer the said grain more squarely to the said endless apron D.

In the drawing the inner slats of the dropper B are represented as being made short on account of the angling or inclined position of the endless apron D; but this is unnecessary, as the said slats may project over the inner corner of the said endless apron.

The harvester should be provided with a stop to prevent the cut grain from falling upon the dropper while the grain upon said dropper is being transferred to the endless apron.

Having thus described our invention, we claim as new and desire to secure by Letters Patent—

1. The dropper B and beater E, combined with a carrier, D, as described, arranged in close proximity thereto, to enable the former to throw the grain on the latter, as specified.

2. In combination with the above, the described mechanism for operating the same, as set forth.

JOHN N. WALLIS.
THEODORE WALLIS.

Witnesses:
H. E. BRANNAN,
HORACE T. COOK.